United States Patent Office 3,387,997
Patented June 11, 1968

3,387,997
VINYLIDENE CHLORIDE - ACRYLATE - ACRYLIC ACID COPOLYMER, WAX-CONTAINING COATING COMPOSITION, COATED POLYOLEFIN, AND METHOD OF COATING
John Damian Sculley, Circleville, Ohio, assignor to E. I. du Pont de Nemours and Company, Wilmington, Del., a corporation of Delaware
No Drawing. Filed Mar. 23, 1965, Ser. No. 442,165
8 Claims. (Cl. 117—138.8)

This invention relates to polymeric coating compositions and more particularly coating compositions consisting of new interpolymers useful for improving the properties of polyolefin films.

In the development of films for the packaging market, in particular polymeric films, such as polyolefin, it is found necessary to apply coatings on them to provide such features as sealability, protection against greases, oils, and undesired permeation of gases, such as oxygen. It has been found that coatings based on vinylidene chloride copolymers provide many of these desired features. In the adaptation of vinylidene chloride copolymer coatings to the polyolefin films, however, it has been observed that in many instances a coated film which will ultimately have good protection against moisture and undesired oils and vapors, has a tendency when first prepared to be somewhat tacky and to have poor surface slip characteristics. This contributes to the formation of very poorly wound rolls especially at the mill roll stage. Undesired wrinkling and puckering of the film in the mill roll entails poor quality film and excessive waste in production operations.

It is further observed that vinylidene chloride copolymers coated on polyolefin films have a tendency to degrade in respect to heat sealability as the film ages. Consequently, unsatisfactory heat sealing performance is experienced in customer operations.

A further requirement is that the coated film should be readily sealable at reasonably low temperatures particularly where the film substrate is thermally sensitive, for example, heat shrinkable films. The readily sealable coated film must not, however, be subject to blocking when stored under hot weather conditions.

Copending patent application, S.N. 340,822, filed Jan. 28, 1964, assigned to the same assignee and in which the present inventor is named as co-inventor, concerns a copolymer coating composition which adequately meets the described requirements outlined above. However, for select packaging purposes, such as, for packaging fresh fruits, vegetables, nuts, flower bed bulbs, coffee, and similar substances, it is also desirable that the coated film provide selective barrier properties to the permeation of certain gases. When packaging the above items it is usually desired that the permeation to oxygen be low, while the permeation to carbon dioxide be high. If these conditions are met when packaging articles that need to "breathe," greatly increased shelf life can result.

According to the present invention there is provided a coating for a polyolefin base sheet, wherein the coating composition consists essentially of (A) an interpolymer consisting essentially of monomeric units of (1) 20 to 55 parts by weight methyl acrylate, (2) to 5 to 35 parts by weight of an alkyl acrylate, wherein the alkyl group contains between 2 and 8 carbon atoms, (3) 35 to 50 parts by weight vinylidene chloride, and (4) from about 1 to 10 weight percent acrylic acid based on the total weight of the monomeric units of (1), (2), and (3), and (B) a naturally occurring wax having a melting point above 75° C. and wherein the wax (B) is present to an amount from 2 to 7.5 weight percent based on the total weight of (A). A polyolefin film coated with the composition of this invention while having good immediate surface slip properties is readily sealable at moderate temperature and resistant to blocking in storage. In addition, the coated film has greatly improved permeability to carbon dioxide while maintaining a low permeability to oxygen.

As used in this invention the term, "consisting essentially of," means that the named materials are essential but that other compounds which do not substantially detract from the basic properties of the composition can also be present. For example, other mono-olefinic monomers that can be copolymerized with the recited monomers can be present so long as they do not detract from the basic properties of the composition. Also, for the purposes of this invention, when the contents of the interpolymer composition are recited, it is to be understood that the sum of the methyl acrylate, alkyl acrylate and vinylidene chloride contents total 100 weight parts.

The interpolymer of this invention is present as an aqueous dispersion in the coating composition and is formulated from at least four monomeric units. Methyl acrylate, vinylidene chloride and acrylic acid are three of the essential monomeric units of the interpolymer, and in addition, monomeric units of at least one alkyl acrylate must be used. The alkyl group of the acrylate can contain between 2 and 8 carbon atoms such as alkyl groups from the straight chain ethane, propane, butane, pentane, hexane, heptane, and octane, and additionally all the branched isomeric groups, such as isopropyl, ethylbutyl, ethylpentyl, ethylhexyl, etc., are suitable for this invention. The carbon atom content of the alkyl group must be sufficient to provide flexability to the eventual coating, though if the alkyl group is predominantly long chain, the resulting coating will be too soft. Thus, it is preferable that the alkyl carbon atoms content of the alkyl acrylate be in the range from two to six carbon atoms.

The relative amounts of the monomeric units used in formulating the interpolymer are critically limited to obtain the desired results. Generally, the parts by weight of the methyl acrylate, alkyl acrylate and vinylidene chloride monomeric units are in the ranges 20–55/5–35/35–50, respectively. Obviously, if the alkyl acrylate is predominantly a long chain alkyl group a lower proportion of it, relative to the methyl acrylate, is preferred to obtain optimum flexability and hardness. Thus, the most useful weight proportions within the above ranges are dependent upon the alkyl acrylates used and the coating properties desired. It is necessary that the vinylidene chloride content be maintained at or below 50 parts by weight to assure a relatively high permeability to carbon dioxide.

For hard flexible coating compositions with good heat sealability and high permeability to carbon dioxide it is preferred that the relative parts by weight ranges of methyl acrylate, alkyl acrylate, and vinylidene chloride be limited to 25–40/10–30/40–48, respectively. In particular, for optimum characteristics, the preferred alkyl acrylates are n-butyl and ethyl acrylate, with the methyl acrylate and alkyl acrylate contents each limited to 25–30 parts by weight.

The monomeric content of the acrylic acid portion of the interpolymer is based upon the total weight of the other three monomers. Generally, the effective weight percentage of acrylic acid monomer is from 1–10 percent, however, the preferred range in order to assure adequate and uniform adhesion of the coating to the film surface is in the weight range of from 3% to 6%.

While a coating composition formed with the above interpolymer has a good heat sealing range and retention of heat sealability as well as good immediate surface slip properties, it is desirable to also incorporate in the coating composition a wax, primarily to prevent the coated films tendency toward blocking with storage. The wax content of the coating is generally present from about 2 to 7.5 weight percent based on the total interpolymer solids with the preferred range being from 4 to 6 weight percent. Suitable waxes for this invention are the naturally occurring waxes having a melting point above 75° C. In order that the wax neither interferes with ready sealability nor contributes to film blocking on storage, it is preferable that the wax melting point be between 75° C. and 100° C. Preferred waxes which are readily available are carnauba, montan, ouricury, and sugar cane wax.

The waxes should be emulsifiable, preferably by means of various monionic surface active agents, so as to be compatible with the aqueous interpolymer dispersions. Among the preferred emulsifying agents are the polyhydroxy nonionic surfactants such as the esters of the sugar alcohols, sorbitol and mannitol. Typical among these are polyoxyethylene sorbitan monolaurate, polyoxyethylene sorbitan monopalmitate, polyoxyethylene sorbitan monostearate and polyoxyethylene sorbitan monooleate. Other operable nonionic surfactants include those obtainable from condensation of ethylene oxide with alkyl and alkanol/amides, with aliphatic alcohols particularly those with at least an eight carbon chain, with alkyl thiols, with phenols, and with aliphatic and aromatic carboxylic acids. In dispersing the wax it is desirable to use the minimum amount of surfactant that will give a stable aqueous dispersion of the wax. Satisfactory dispersions are obtained with wax/surfactant ratios in the range of 1:1 to 5:1. Too large an amount of dispersing agent can interfere with heat sealability of the coated film.

As stated before, it is to be understood that other components which do not materially detract from the basic properties of the coating of this invention can be added. Thus, where an extremely high surface slip is desired, conventional slip agents, such as polyvinyl chloride latex dispersions, can be included in the coating of this invention.

The interpolymer of this invention can be formulated by any of the well known aqueous polymerization methods in which the monomers are polymerized in an aqueous medium in the presence of suitable catalytic initiators, catalysts, and surfactants. The degree of polymerization and interpolymer particle size, controlled by the reaction temperature and catalyst concentration, while not critically limited, nevertheless, influences the properties of the eventual coating. Generally, the polymer particle size should be such that sufficient coalescence of the coating occurs on drying. Likewise, the degree of polymerization should be sufficient to result in an interpolymer intrinsic viscosity greater than 0.5 to avoid blocking tendencies with the preferred range of intrinsic viscosity from 1.0 to 2.0. Intrinsic viscosity values of greater than 2.0 are also operable with appropriate adjustment of the interpolymer composition. For the purposes of this invention intrinsic viscosity is determined as described in "Textbook of Polymer Chemistry"—F. W. Billmeyer, Jr.—Interscience Publishers, Inc., New York, 1957, chapter 14. It is defined as follows:

$$\text{Intrinsic viscosity} = \left(\frac{Ln\ Nr}{C}\right) C \to 0$$

wherein Ln is the natural logarithm. Nr is the viscosity of the solution relative to the solvent and "C" is the concentration expressed in grams of solute per 100 ml. of solvent. In the present invention, tetrahydrofuran at 30° C. is used as the solvent. After polymerization is completed and any large coagulants of interpolymer filtered off, the waxeous emulsion can be added directly to the interpolymer dispersion.

The coating of this invention is applied to a polyolefin base film. For strength of the base film it is generally preferred that it be biaxially oriented, which can be accomplished by known techniques. It is also desirable, for eventual appearance of the coated film, that the polyolefin film have a limited heat shrinkage, preferably less than five percent. To assure adequate adhesion of the coating, the polyolefin films are usually pretreated to promote adhesion on at least one surface and preferably on both surfaces. Polyolefin film can be pretreated by subjecting it to treatment, such as (1) electrical discharge treatment (2) flame treatment or (3) treatment with oxidizing solutions. Useful examples of polyolefin films are polypropylene, polyethylene, polyethylene terephthalate, polyvinyl chloride, and polyvinyl fluoride. Biaxially oriented polypropylene film, having a shrinkage of less than 5% when heated at 130° C. for one minute, is the most preferred base sheet.

The coatings can be applied in the form of aqueous dispersions, generally containing between 40 and 50 weight percent solids, in accordance with any known coating techniques. They can be applied by passing the film through baths in a continuous manner or in a batch manner. Coatings can also be sprayed onto the film. A particularly suitable procedure is that described in U.S.P. 2,977,243. The thickness of the coatings can be adjusted in accordance with methods well known in the coating art.

Example I below presents a formulation of the preferred coating composition of this invention and its application to a film surface. The ratio of the parts by weight of the monomers for the interpolymer are (1) 27.5 parts methyl acrylate, (2) 27.5 parts alkyl acrylate and (3) 45 parts vinylidene chloride with a 4 percent acrylic acid content, based on the total weight of (1), (2), (3).

EXAMPLE I

In a reactor fitted with a stirrer and condenser and flushed with nitrogen, the following ingredients are placed at room temperature:

| Ingredient: | Weight (lbs.) |
| --- | --- |
| Water | 130 |
| "Duponol" WAQ [1] | 4.14 |
| Acrylic acid | 4.8 |
| Methyl acrylate | 33 |
| n-Butyl acrylate | 33 |
| Vinylidene chloride | 54 |

[1] "Duponol" WAQ (E. I. du Pont de Nemours & Co.)—sodium salt of a fatty alcohol sulfate in aqueous solution, 33% active ingredient.

The weight tank is flushed with 40 lbs. of water which is added to the ingredients listed above, after which heating of the reaction mixture is started. When the temperature of the mixture reaches about 29° C., 18.0 grams of ammonium persulfate dissolved in water is added. At a temperature of 30–31° C., 9.0 grams of sodium metabisulfite and 0.6 grams of ferrous ammonium sulfonate, both dissolved in a small quantity of water are added (total including that added with catalyst—11 lbs.) and heating is continued.

The condenser of the reactor is left open to the atmosphere for 30–45 minutes as the reaction mixture begins to reflux at about 35° C., it is then closed as exothermic reaction proceeds, during which a pressure of about 5 p.s.i.g., develops. When the reaction mixture stops refluxing, nitrogen is introduced through the condenser to a pressure of 5–10 p.s.i.g. until the mixture begins to cool, indicating completion of the reaction.

There is then added to the reactor an additional 4.14 lbs. of "Duponol" WAQ mixed with 4.0 lbs. of water and 100 ml. of concentrated ammonium hydroxide. The reaction mixture is filtered after which carnauba wax dispersed as a 10% emulsion with 2.0%/5.2% "Span" 60/"Tween" 60 mixture is added to the mixture to give 5% wax solids based on the total weight of the copolymer solids. "Span" 60/"Tween" 60 is a sorbitan monooleate polyoxyethylene/sorbitan monooleate mixture of Atlas Chemical Co.

Following the procedure of U.S.P. 2,648,097 a one-mil thick biaxially oriented polypropylene film is treated for adherability by subjecting its surface to a substantially neutral flame as the film is passed over a drum maintained at 70° C. The film is then passed at 50 feet/min. through a coating bath of an aqueous dispersion of the interpolymer prepared as described above. Excess dispersion is doctored from the film surface and the coated film is dried by passing through a coating tower held at a temperature of 65° C. The dried film bearing 6 grams/square meter of coating is wound into mill rolls. The film has excellent immediate surface slip and very high quality well formed mill rolls with no indication of wrinkling or buckling. Similar results are obtained when a coating operation is carried out at 150 feet/minute.

The coated film of Example I is tested for heat-seal strength, blocking tendencies, and oxygen and carbon dioxide gas permeability. The details of how these tests on the coated film are conducted is as follows:

Heat-seal strength is measured by cutting a piece of the coated film, 4″ x 10″, into two pieces, 4″ by 5″ each, with the long direction being in the direction of polymer extrusion (the machine direction). The two pieces are then superimposed so that opposite surfaces (the coated surfaces) are in contact. The two pieces of superimposed film are then sealed together at each end at right angles to the machine direction axis. For these tests, the films are sealed using a pressure of 10 p.s.i. for a 0.25 second dwell time and a temperature of 130° C. The sealed sheet is then cut in half at right angles to the machine direction axis. From the center of the resulting pieces, one inch wide strips parallel to the machine axis are cut. These are conditioned for one day at 75° F. and 25% relative humidity and then tested by placing the free ends of the strips in a Suter Tester Machine and pulling them apart. The highest force in grams required to pull the strips apart is taken as a measure of the heat-seal bond strength.

Gas permeability is measured by sealing the test film between the high and low pressure side of a split permeability cell. The test gas is passed through the high pressure side; the low pressure side to which a manometer is attached is evacuated to a pressure of approximately 3 millimeters of mercury. At this point, the low pressure side is sealed off; but, the flow of the test gas at one atmosphere is continued through the high pressure side. Diffusion of gas through the test film is then graphically recorded by plotting the rate of fall of the manometer as a function of time. Gas laws are applied to the data so obtained and the gas permeability value is expressed in grams/100 sq. meters/hr./mil.

The blocking test is conducted by stacking sheets of the coated film under a pressure of 1½ lb./sq. inch and placing the stack in an oven at 55° C. for 18 hours. The stored films are graded for blocking as follows: 10—no evidence of sheets sticking together; 8—sheets slightly cling together—can be separated without damage to the coating; 6—sheets stuck together tightly.

For comparatively evaluating the coating of this invention, other coated films were prepared and tested in accordance with the above described procedures. Exemplary results of these tests are presented in Table I. Sample I refers to the preferred coated film as set forth in Example I. Sample 2 shows test results using the preferred n-butyl acrylate ester but not within the preferred composition limits, (i.e., the methyl acrylate content exceeds 40 weight parts and the n-butyl acrylate is less than 25 weight parts). Sample 3 shows test results using, as the alkyl ester, 2-ethylhexyl acrylate (i.e., an alkyl ester wherein the alkyl group has more than six carbon atoms). The compositions of samples 2 and 3 were formulated and applied to the coating in accordance with the procedure of Example I.

TABLE I

| Sample | Parts by Weight | | | | Weight Percent AA | Heat Seal Strength [1] | | Blocking Test [2] |
|---|---|---|---|---|---|---|---|---|
| | VCl² | MA | BA | EHA | | 0 hr. | 1 wk. | |
| 1 | 45 | 27.5 | 27.5 | | 4 | 394 | 374 | 10 |
| 2 | 45 | 41.75 | 13.75 | | 4 | 164 | 114 | 8 |
| 3 | 45 | 27.5 | | 27.5 | 4 | 188 | 154 | 6 |

[1] Of Coated Film, g./in., sealed at 10 p.s.i., 0.25 sec., at 130° C.
[2] At 55° C., 1.5 p.s.i.

Legend:
VCl²=Vinylidene chloride.
MA=Methyl acrylate.
BA=n-Butyl acrylate.
EHA=2-ethylhexyl acrylate.
AA=Acrylic acid.

Oxygen and carbon dioxide permeability test were also conducted on the coated film of Example I. The results of these tests showed an oxygen permeability of 6.6 (grams/100 sq. meters/hour/mil) and a carbon dioxide permeability of 25.97 (grams/100 sq. meters/hour/mil). A comparative permeability test on a sample containing a higher vinylidene chloride content (80 parts by weight vinylidene chloride, 20 parts by weight methyl acrylate, and 4 weight percent acrylic acid) prepared as set forth in application, SN. 340,822, was also conducted. This sample, comparatively, showed a lower oxygen permeability of 0.2 to 0.7 (gram/100 sq. meters/hour/mil), though also yielding a much lower carbon dioxide permeability of 1.9 (grams/100 sq. meters/hour/mil).

What is claimed is:

1. A polyolefin base film having, coated thereon, a composition consisting essentially of (A) an interpolymer consisting essentially of (1) 20–55 parts by weight methyl acrylate, (2) 5–35 parts by weight of an alkyl acrylate having two to eight carbon atoms in the alkyl group, (3) 35–50 parts by weight vinylidene chloride, and (4) 1–10 weight percent acrylic acid based on the total weight of (1), (2), and (3), and (B) a naturally occuring wax having a melting point above 75° C. and wherein the wax (B) is present in an amount from 2–7.5 weight percent of (A).

2. A biaxially oriented polyolefin base film with at least one surface treated to promote coating adhesion, and having coated thereon, a composition consisting essentially of (A) an interpolymer consisting essentially of (1) 25–40 parts by weight methyl acrylate, (2) 10–30 parts by weight of an alkyl acrylate having two to six carbon atoms in the alkyl group, (3) 40–48 parts by weight vinylidene chloride, and (4) 3–6 weight percent acrylic acid based on the total weight of (1), (2), and (3), and (B) a naturally occurring wax having a melting point between 75° C. and 100° C. and wherein the wax (B) is present in an amount from 4–6 weight percent of (A).

3. The coated polyolefin base film of claim 2 wherein (1) the parts by weight methyl acrylate, is 25–30 and (2) the parts by weight alkyl acrylate, is 25–30 and wherein the alkyl acrylate is selected from the group consisting of ethyl acrylate and n-butyl acrylate.

4. The coated polyolefin base film of claim 3, wherein the polyolefin base film is selected from the group consisting of polypropylene, polyethylene, polyethylene terephthalate, polyvinyl chloride, and polyvinyl fluoride and wherein the naturally occurring wax is selected from the group consisting of carnauba, montan, ouricuri, and sugar cane wax.

5. A biaxially oriented polypropylene base film having a shrinkage of less than 5% when heated at 130° C. for one minute and with at least one surface treated to promote coating adhesion, and having coated thereon, a composition consisting essentially of (A) an interpolymer having an intrinsic viscosity within the range of about 0.5 to 2.0 and consisting essentially of (1) 27.5 parts by weight methyl acrylate, (2) 27.5 parts by weight n-butyl acrylate, (3) 45 parts by weight vinylidene chloride, and (4) 4 weight percent acrylic acid based on the total weight of (1), (2), and (3), and (B) 5 weight percent, based on the total weight of (A), of carnauba wax.

6. The coated polyolefin base film of claim 5, wherein the base film is treated to promote coating adhesions on both sides and wherein the base film is coated on both sides.

7. The process comprising: coating a biaxially oriented polyolefin film having at least one surface treated to promote adhesion of a coating thereon with an aqueous dispersion containing (A) an interpolymer consisting essentially of (1) 20–55 parts by weight methyl acrylate, (2) 5–35 parts by weight of an alkyl acrylate having two to eight carbon atoms in the alkyl group, (3) 35–50 parts by weight vinylidene chloride, and (4) 1–10 weight percent acrylic acid based on the total weight of (1), (2), and (3), and (B) a naturally occurring wax having a melting point above 75° C. and wherein the wax (B) is present in an amount from 2–7.5 weight percent of (A) and drying the coating.

8. A composition of matter comprising: (A) an interpolymer consisting essentially of (1) 20–55 parts by weight methyl acrylate, (2) 5–35 parts by weight of an alkyl acrylate having two to eight carbon atoms in the alkyl group, and (3) 35–50 parts by weight vinylidene chloride, and (4) 1–10 weight percent acrylic acid based on the total weight of (1), (2), and (3), and (B) a naturally occurring wax having a melting point above 75° C. and wherein the wax (B) is present in an amount from 2–7.5 weight percent of (A).

References Cited
UNITED STATES PATENTS

| | | | |
|---|---|---|---|
| 2,525,671 | 10/1950 | Hauser | 260—28.5 |
| 2,570,478 | 10/1951 | Pitzl | 260—78.5 |
| 2,829,069 | 4/1958 | Michel | 117—76 |
| 2,910,385 | 10/1959 | Berry et al. | 117—138.8 |
| 3,041,208 | 6/1962 | Hay et al. | 117—138.8 |
| 3,250,639 | 5/1966 | Stead | 117—47 |
| 3,255,034 | 6/1966 | Covington et al. | 117—47 |

WILLIAM D. MARTIN, *Primary Examiner.*

W. D. HERRICK, *Assistant Examiner.*